(No Model.) 2 Sheets—Sheet 1.
S. MOORE.
MACHINE FOR MAKING BEAD CHAINS.
No. 408,314. Patented Aug. 6, 1889.
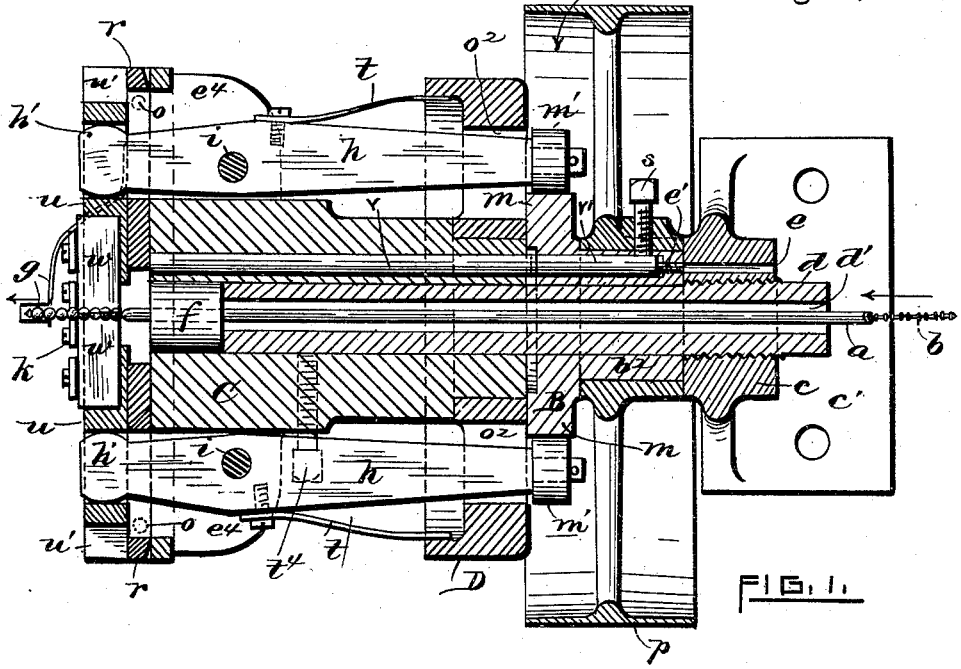
FIG. 1.
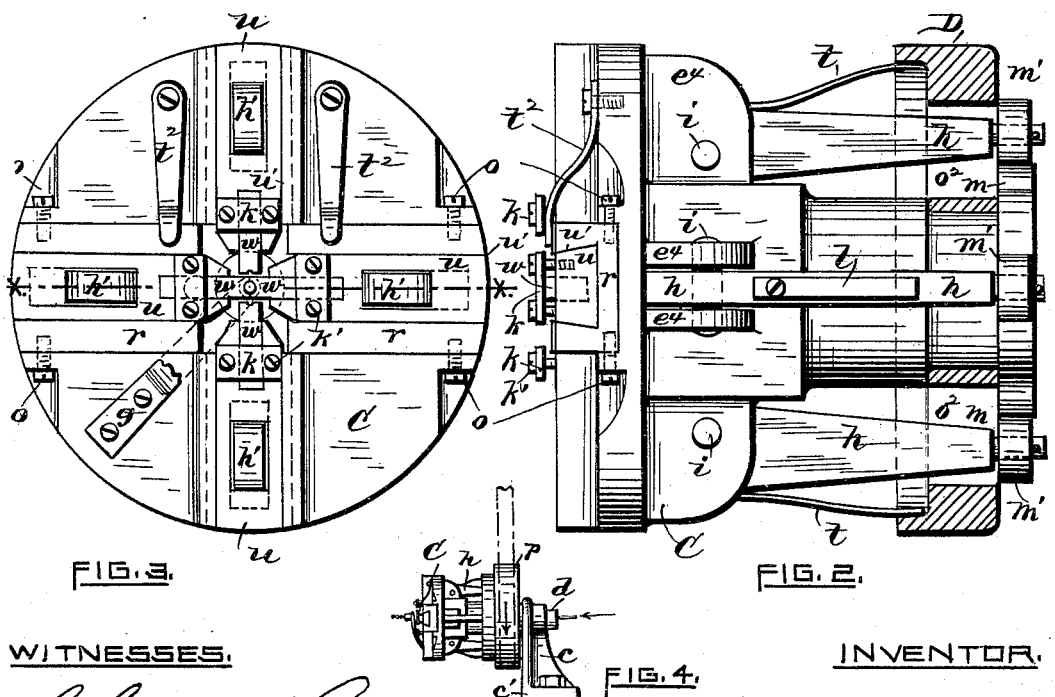
FIG. 3.  FIG. 2.
FIG. 4.
WITNESSES.  
Charles Hannigan  
C. W. Boardman
INVENTOR.  
Samuel Moore.  
by Remington & Henthorn  
Attys.

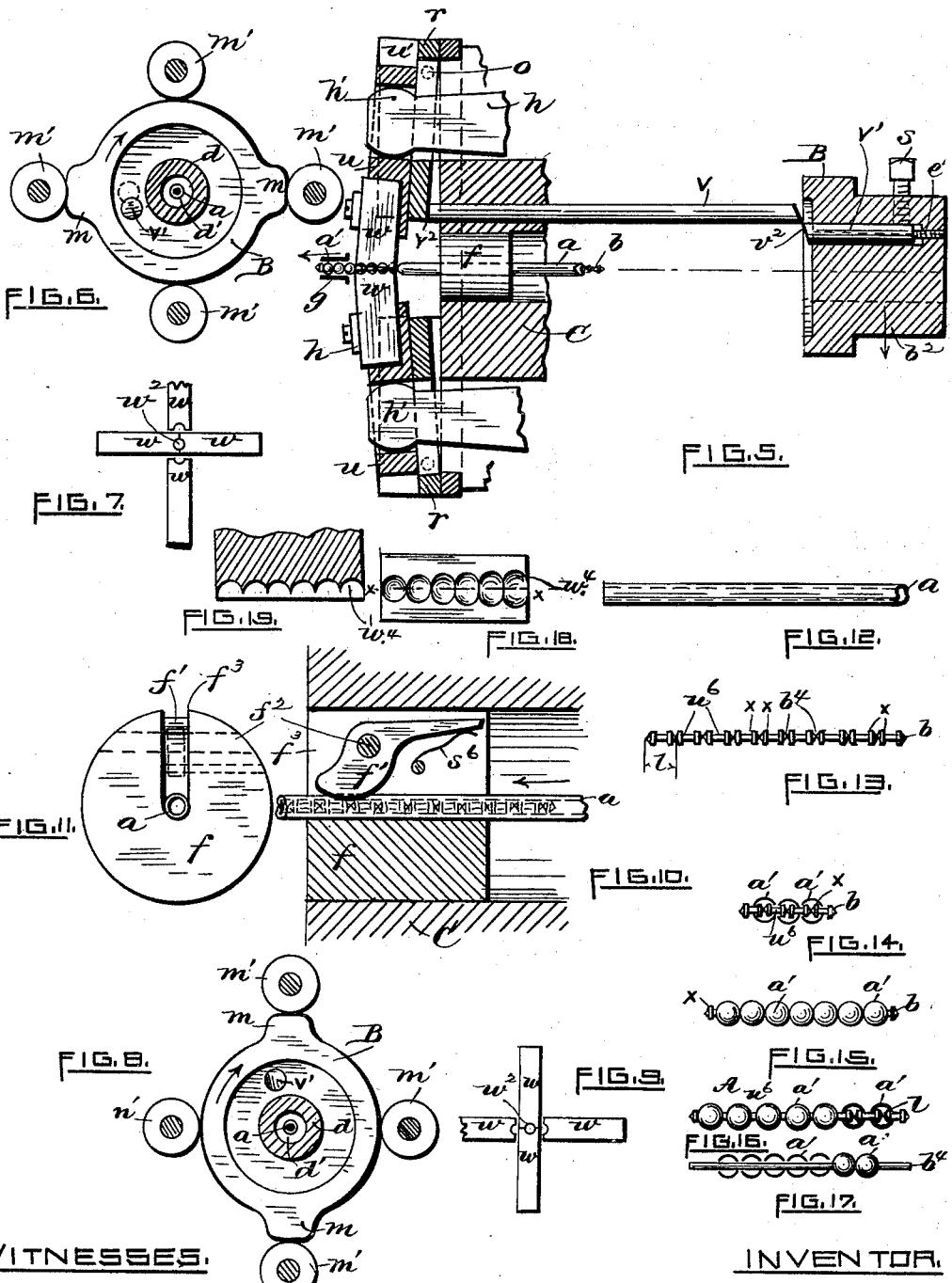

UNITED STATES PATENT OFFICE.

SAMUEL MOORE, OF PROVIDENCE, RHODE ISLAND.

MACHINE FOR MAKING BEAD-CHAINS.

SPECIFICATION forming part of Letters Patent No. 408,314, dated August 6, 1889.

Application filed March 12, 1889. Serial No. 302,975. (No model.)

*To all whom it may concern:*

Be it known that I, SAMUEL MOORE, a citizen of the United States, residing at Providence, in the county of Providence and State of Rhode Island, have invented certain new and useful Improvements in Machines for Making Bead-Chains, &c.; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

In the manufacture of bead-chain it has been the practice heretofore to make it in comparatively short lengths, such limitation being largely due to the fact that it is produced by "hand," as it is termed, the quantity of chain turned out daily by a workman being some twenty-five to thirty lineal feet. The chain thus made is produced from a thin metallic tube plated or not, as desired, having a strip of prepared wire passing longitudinally through it. The two parts thus combined are introduced to suitable dies mounted in a hand-press. The repeated action of the dies upon a section of the tube, which is slowly revolved, gradually transforms that portion of it to a corrugated form, approximately globular. The final stroke of the die completely severs the globe or unit from the end of the tube and closes each side of it down upon the prepared wire within. As fast as a unit is severed the workman feeds the tube and wire ahead the proper distance to produce another unit, and so on throughout the entire length of the stock. I would state that the prepared wire referred to has been so treated that it presents the appearance of a series of continuous miniature dumb-bells united together at the ends by a very slight amount of metal. Now when the unit is completed it will contain the end portions of two contiguous dumb-bells or ties. After the tube is thus segregated it is passed over a curved surface a few times, which operation severs the ties from each other and gives to the chain the quality of flexibility. The chain thus produced may be cut into suitable lengths and then mounted and used for necklaces, watch-chains, &c.

Another method of producing bead-chain is to unite the previously-formed hollow units by the employment of separable links or ties, one of which is inserted through the bead. Another link is next attached to the first one, a bead passed over the last link, and so on, the chain being made up of a succession of links and units. This method of making bead-chain is even slower than that before described.

The object of my invention is to facilitate the manufacture of bead-chain, thereby not only increasing the production several fold, and consequently reducing the cost, but at the same time producing a bead-chain of superior quality.

To this end my invention consists of an automatically-operating machine provided with dies which are successively brought into engagement with the tube to reduce it to beads or units and a feeding device which intermittingly forces the non-revolving tube ahead immediately upon the completion of a unit.

In the accompanying two sheets of drawings, illustrating my machine for making bead-chain, Figure 1, Sheet 1, represents a horizontal sectional view taken through the center of the hollow spindle, &c., a tube being acted upon by the dies. Fig. 2 is a plan view in partial section, a portion of the rear of the machine being omitted. Fig. 3 is a front view. Fig. 4 is a side view in reduced scale, showing the machine mounted upon a frame or standard. Fig. 5, Sheet 2, is a partial horizontal sectional view taken on line $x$ $x$ of Fig. 3, showing the tube, &c., forced ahead to its limit by the action of the feeding device. Fig. 6 is a front view of the revolving cam-disk, showing the position corresponding with that of the dies shown in Figs. 3 and 5. Fig. 7 is a corresponding outline front view
of the dies. Fig. 8 is a front view of the cam-disk, showing the relative position of the vertical dies in working. Fig. 9 is a corresponding front view of the dies themselves. Fig. 10 is an enlarged sectional view taken through the center of the rear guide and showing a gripping-dog mounted therein to prevent a rearward movement of the tube. Fig. 11 is a front view. Fig. 12 shows a piece of tubular wire or stock adapted to be transformed into globular units or beads. Fig. 13 is a side view of the prepared or grooved wire, termed "packing," adapted to be easily separated into ties or links, the wire to be inserted into the tube and the two fed ahead in unison as fast as the units are formed. Fig. 14 is a sectional view showing the units upon grooved wire and their relation to each other, the ties being still connected. Fig. 15 is a corresponding side view of the chain as it emerges from the machine. Fig. 16 is a side view in partial section, showing the chain ready for use, the ties being completely severed. Fig. 17 shows a manner of forming beads by the aid of a plain wire. Fig. 18 is an inverted plan view of one of the dies, and Fig. 19 is a sectional view taken on line $x$ $x$ of Fig. 18.

A description of my improved bead-chain-making machine more in detail and the manner of its operation are as follows:

$c$ indicates the main frame, having the operating mechanism mounted and attached thereto. Bolts passing through the base $c'$ of the frame serve to secure it to a suitable base or table F, Fig. 4. The center or eye of the frame $c$ is screw-threaded to receive the hollow spindle $d$, which is screwed into it.

B designates a cam-disk provided with a reduced hub $b^2$, loosely mounted upon the spindle and adjacent to the front face of the frame. To the hub of the disk is secured a pulley $p$, Fig. 1, adapted to receive a driving-belt leading from any suitably-mounted driving-pulley.

C indicates a die-carrying head provided with a rearwardly-extending hub portion, which is slightly reduced in diameter at its rear end to receive a disk D, provided with elongated openings $o^2$ to receive the levers $h$. The head is bored axially to receive the front portion of the spindle $d$ and is secured to it by a set-screw $t^4$. Thus it will be seen that the head and its attached parts do not revolve. The face of the head is enlarged and is provided with four radially-arranged die-blocks $u$, each carrying a die $w$ at its lower end, which are held firmly in position by the clamps $k$ and bolts $k'$, the dies being arranged to work in pairs. The die-blocks $u$ are fitted to move radially in dovetail openings $u'$, Fig. 2, &c. At the back of each die-block an opening is formed through the enlarged portion of the head C, and further provided with ears $e^4$, in which a pin $i$ is mounted. These openings are arranged to coincide with the openings $o^2$ of the disk D.

Each of the die-blocks is provided at its upper portion with an elongated opening extending through it transversely. These openings are adapted to each receive the enlarged and rounded front end $h'$ of the lever $h$, pivoted to its respective pin $i$. The levers extend rearwardly through the openings of the disk D and carry each a loosely-mounted roll $m'$, which is positively maintained in contact with the periphery of the revolving disk by means of a spring $t$. The disk is provided with two oppositely-arranged cam-like projections $m$, which simultaneously engage and actuate a pair of levers. By means of this arrangement of dies, &c., it is evident that only two of the dies can at the same time engage the stock passing through the machine.

The construction of the feeding device is as follows: The cam-disk B is provided with a longitudinal hole, in which is fitted a piece of wire $v'$. The rear end of said hole is provided with a small screw $e'$ for the purpose of effecting a proper adjustment of the wire with relation to the wire $v$, to be described. A hole $e$ formed in the hub $c$ in line with the wire affords means for the entrance of a screw-driver to engage the screw. After the adjustment has been effected, a set-screw $s$ serves to maintain the short wire $v'$ in position. The front end $v^2$ of this wire is beveled, Fig. 5, but does not extend beyond the outer face of the recessed cam-disk.

It will be noticed (referring to Figs. 2 and 3) that one pair of die-blocks $u$ are mounted in holders or "aprons" $r$, which are fitted into the head C, yet by means of pivot-pins $o$ the holders are susceptible of being vibrated to a certain extent at their lower ends. The head C is drilled throughout its entire length in line with the hole before described formed in the cam-disk to receive a rod or wire $v$. The front end of this rod bears against the holder $r$, and the rear end, which is beveled, extends into the recess formed in the face of the cam-disk, as shown in Fig. 1. Now, upon turning the disk the contiguous end of the wire $v'$ will engage that of the rod $v$ and force it endwise or ahead, thereby vibrating the holder, as shown in Fig. 5, and causing the die to be projected in front beyond the other pair of dies a corresponding distance. Springs $t^2$, Figs. 2 and 3, act to instantly return the holders to their normal position upon the passage of the piece $v'$.

The hollow wire or tubular stock employed, which is to be transformed into beads or units, is indicated by $a$. This wire is of the desired quality, size, and thickness, and is continuous.

$b$ indicates the prepared wire or packing, which is to be inserted within the tube and both passed into the machine to be transformed into bead-chain. The wire may be prepared in any manner—as, for instance, by rolling between dies. This wire $b$ may be stated to present an appearance of a series of very small "dumb-bells" continuously united at their ends. The two ends or enlargements $x$ of any contiguous pair are connected by a very slight tie $b^4$—in fact, being nearly severed. (See Fig. 13.) Each of these when severed constitutes a tie or connecting-link $l$, each unit $a'$ then inclosing the adjacent heads $x$ of two links, while two adjacent units are held together by one link. (See Fig. 16, &c.)

In Figs. 18 and 19 is represented the arrangement of the die-cavities. These are made progressive—that is to say, the rear cavity $w^4$ nearest the spindle acts to clearly define and roughly outline the unit, the next cavity (being a little smaller) reduces the unit still more, the next still further shapes the unit and completely severs it from the tube, the last cavity acting to completely finish the unit and close the ends down over the metal $u^6$ of the link.

I would state here that the number of the die-cavities, as well as the form of them, may be changed or varied according to the shape and size of stock used. In some cases I use a die $w$ having a series of eight or ten cavities, it being obvious that the greater the tube and thickness of its metal the greater the number of cavities required to produce the best quality of chain.

To the front of the head C is located at the rear of the die-holders a cylindrical guide $f$, having an opening $f^3$ extending through it, in which the wire $a$ passes. (See Figs. 10 and 11.) A cam dog or lever $f'$ is pivoted at $f^2$ to the guide. The dog is curved transversely to engage the tube. An end of the lever extends rearwardly and is provided with a light spring $s^6$, which insures the contact of the cam and tube. The object of this is to permit a free forward movement of the tube $a$ and to prevent a rearward movement of it. This check is rendered necessary because without it or some equivalent device the stock would be liable to become disarranged upon the return of the dies after feeding the wire ahead, or even the jarring of the parts in working might act to change the relation of the parts, thereby producing imperfect chain.

The joint operation of the several parts is as follows: We will assume that the dies have been made and adjusted to the size of the hollow wire $a$ and that the link-wire $b$ is of the proper size. The latter, in suitable lengths of several feet, is now inserted within the tube from its rear end until it projects from the front end of the tube, and both then passed to the separated dies $w$. Now, upon starting the machine, the belt causes the pulley and its connected parts to revolve in the arrow direction, the two lugs $m$ of the cam-disk B first acting through the medium of the levers $h$ and die-blocks $u$ to close the two vertical dies past the two separated lateral dies and down upon the tube $a$, the position of the cam and dies then being as shown by Figs. 8 and 9, thereby forming a preliminary unit or creases in the periphery of the tube, within which are located the connected ends $x$ of two contiguous links $l$. The cam quickly passes from under the lever-rolls $m'$. The springs $t$ then separate the dies and return them to the normal or open position. The cam-lugs next engage the lateral levers, thereby closing the attached dies upon the tube from opposite sides and at right angles with the first set of dies, as indicated by Figs. 1, 3, 6, and 7.

While the cam and dies just described are thus in operation and have completed the blow, the beveled end $v^2$ of the rod $v'$, which is mounted radially a little past the center of the lug $m$, (see Fig. 6,) engages the corresponding end of the normally stationary rod $v$ and forces the pivoted holder or apron outwardly, as shown in Fig. 5, the opposite holder at the same time vibrating in unison with it by reason of the engagement of the die-cavities with the corrugations formed in the tube $a$, thereby feeding the work ahead past the check-dog $f'$ a distance equal to one unit. The feeding-dies also act to sever the unit from the tube and completely shape it, the ends of the unit now being nearly closed down upon the cylindrical surfaces $u^6$ of the links, as shown by Fig. 14. As the cam-lugs pass the rolls $m'$, Fig. 6, the springs $t$ act to depress the levers, thereby opening the jaws or dies. At the same time the front springs $t^2$ force the holders $r$ rearwardly to their normal position, followed by the action of the cam upon the vertical dies, the operation before described being continually repeated throughout the length of the tube. A tubular guide $g$ is secured to the front of the head C, the mouth of which is in close proximity to the dies $w$. This guide receives the chain as fast as formed and prevents it from displacement. After the length of chain thus formed is produced by the machine it presents the appearance shown in Fig. 15, or as shown sectionally by Fig. 14, the several links or ties being still united. In order to separate them the chain may be subjected to a suitable "tumbling" process, or it may be passed back and forth over the surface of small rolls, which movement acts to sever the ties from each other and gives to the chain the appearance shown by Fig. 16 and imparts to it the desired flexibility.

I find that by substituting a plain wire $b^4$ (shown by Fig. 17) in lieu of the corrugated wire $b$ the machine may be employed to simply transform the length of tube into separate units $a'$, the wire being withdrawn from them after its passage through the machine. The rod or wire may be repeatedly used, if desired.

It will be seen that the machine is very simple and compact, yet having all its parts conveniently accessible for change and adjustment. The speed of the pulley may be almost unlimited. I find that a rapid revolution of the cam, &c., produces better work, as well as increasing the amount, than when it is run comparatively slow. This advantageous result is, I believe, due to the fact that the action of the dies upon the tube partakes more of the characteristic of a blow, like a hammer. The tube, before being acted upon by the dies, may be annealed, if desired.

The number of actuated dies $w$ employed may be more or even less than the four represented by the drawings without departing from the spirit of my invention.

I claim as my invention—

1. The automatically-operating machine herein described, constructed, arranged, and adapted to receive a continuous piece of hollow wire or tubing $a$, having therein a continuous piece of prepared wire $b$, adapted to be easily severed at regular intervals and intermittingly present them to the action of dies, which transform the tube into segregated units connected by the internal wire.

2. In a machine of the character hereinbefore described, the combination of a hollow arbor or spindle, a series of dies $w$, having formed in their working-faces a series of progressive die cavities or molds, mechanism for intermittingly reciprocating the dies in a radial direction, and a feeding device working conjointly with one or more of said dies, substantially as set forth.

3. The combination and arrangement, in a single machine for producing bead-chain, of a stationary hollow arbor or spindle, a die-actuating cam-disk and pulley mounted to revolve upon the arbor, a head secured to the arbor, a series of radially-arranged die-blocks mounted to reciprocate in the head, levers engaging said cam-disk and die-blocks, an intermittingly-actuated rod engaging a pivoted die-holder carrying a die-block, and a combined guide and check lever to prevent the work from moving rearwardly, substantially as hereinbefore described.

4. In a single machine for producing bead-chain, the combination, with a stationary hollow spindle and a pulley and cam-disk provided with an adjustably-mounted feed-actuating rod or pusher mounted to revolve around said spindle, of a stationary head having a series of radially-arranged die-blocks mounted in its face, pivoted levers engaging the die-blocks and cam-disk, a pivoted holder $r$, intermittingly actuated by said pusher, and a check-lever arranged to restrain the work from rearward movement, substantially as hereinbefore described.

5. In a machine for producing bead-chain, the combination, with driving and feeding mechanism, substantially as described, of intermittingly-operating bead-forming dies $w$, a stationary head having said dies mounted therein, a hollow spindle through which the stock is intermittingly fed to be acted upon by the dies, and a central guide $g$, mounted at the front of the head to receive the work after its passage through the dies, substantially as hereinbefore set forth.

6. The combination of a series of intermittingly-operating bead-forming dies $w$, a check or restraining device to prevent the stock-tube $a$ from rearward movement, and intermittingly-operating stock-feeding mechanism, substantially as hereinbefore set forth.

In testimony whereof I have affixed my signature in presence of two witnesses.

SAMUEL MOORE.

Witnesses:
CHARLES HANNIGAN,
GEO. H. REMINGTON.